United States Patent Office 2,781,340
Patented Feb. 12, 1957

2,781,340

EXTRACTION OF COENZYME A FROM MICROBIOLOGICAL MATERIALS

John S. Evans and William H. De Vries, Kalamazoo, Mich., assignors to The Upjohn Company, Kalamazoo, Mich., a corporation of Michigan No Drawing. Application September 28, 1951,
Serial No. 248,884

16 Claims. (Cl. 260—211.5)

This invention relates to the extraction of coenzyme A from microbiological materials and in particular to a method for the extraction of coenzyme A from the class of materials known as the microorganisms of fermentation, which includes the molds, yeasts and bacteria.

Coenzyme A is present in most living materials [Kaplan and Lipmann, J. Biological Chemistry 174, 37 (1948)], and is especially abundant in the microorganisms of fermentation such as *Proteus morganii, Lactobacillus arabinosus, Lactobacillus delbrueckii*, dried yeast, *Escherichia coli*, propionic acid bacteria, *Clostridium butylicum*, the Streptomyces such as *Streptomyces griseus* and *Streptomyces fradiae*, and the Penicillia such as *Penicillium notatum*.

Coenzyme A has been shown by Olson et al. [Arch. Biochem. 22, 480 (1949)] to be involved in numerous biological reactions such as acetylation of aromatic amines, acetyl choline synthesis, acetyl phosphate synthesis, acetoacetate synthesis, pyruvate and acetate oxidation, citrate synthesis, and is probably involved in acetate catabolism, which is thought to be involved in the biological synthesis of higher organic compounds such as the steroids.

Heretofore coenzyme A has been isolated from microbiological sources by freezing the cells for several days to effect lysis, suspending the ruptured cells in ice water, centrifuging to separate the extract from the cells, and freeze drying the aqueous extract to obtain a concentrate of coenzyme A which must be stored in a refrigerated desiccator. Since the entire process must be conducted at a relatively low temperature, it is quite difficult to adapt such a process to the commercial production of coenzyme A concentrates.

It is an object of this invention to provide a method for the concentration and purification of coenzyme A which can be conducted at or near room temperature. It is a further object of this invention to provide a concentrate of coenzyme A which is stable at room temperature. Other objects will become apparent hereinafter.

Coenzyme A can be obtained in a concentrated form free from many of its congeneric impurities by a process which comprises: (1) separating coenzyme A from the fermentation cells, (2) adsorbing coenzyme A on activated carbon, (3) separating the carbon and coenzyme A adsorbed thereon from unadsorbed impurities, and (4) eluting the adsorbed coenzyme A from the carbon.

Coenzyme A is usually found throughout the fermented medium, being distributed in varying proportions between the fermentation organisms and the nutrient medium. As in some instances the major proportion of the coenzyme A present is found in the fermentation cells, it is necessary, in order to obtain the maximum amount of coenzyme A, to lyse the cells.

The quantity of coenzyme A present and its distribution, i. e., whether it is principally in the culture liquid or in the organism of the fermentation, can be determined readily by the assay method of Kaplan and Lipmann [J. Biological Chemistry 174, 37 (1948)]. In order to recover any coenzyme A associated with the cells, they must be lysed. The various methods of lysing the cells known to the art can be used, such as freezing, or heating either an aqueous suspension of the isolated cells or the entire fermentation brew between 60 and 120 degrees centigrade for about ten minutes to three hours, preferably at a pH of about one to three.

The hydrogen-ion concentration at which the culture is filtered is dependent upon the filtration characteristics of the fermented medium. Ordinarily, the yeasts can be filtered without adjustment of the pH while the Penicillia are most satisfactorily filtered at a pH of about 5.5 and the Streptomyces at a pH of about 1.9 to 4.5.

The various aqueous extracts of coenzyme A, whether obtained by lysis of the cells or by fermentation alone, can be clarified by filtration either with or without a filter aid such as diatomaceous earth. The amount of filter aid required for convenient filtration varies with the microorganism employed in the fermentation. In general, bacteria require about fifty grams per liter, while yeasts require about twenty grams per liter and molds ordinarily can be filtered without a filter aid.

The amount of activated carbon required to adsorb coenzyme A from an aqueous acid solution is dependent upon the concentration of coenzyme A and the impurities present, and is best determined by adding measured amounts of carbon to an aliquot of the solution until about 90 to 95 percent of the coenzyme A present has been adsorbed. In general, the coenzyme A present in a fermented medium requires about ten grams of carbon per liter of solution while more concentrated solutions of coenzyme A require about 0.7 to 1.5 grams of carbon for each 100,000 units of coenzyme A present.

Although activated carbon will adsorb coenzyme A from an aqueous solution over a wide range of pH, namely, from one to ten, with a pH of between about one and five being very satisfactory. Optimum results are obtained at a pH of between about one and four for either a fermented media or a partially purified solution. The rate of adsorption of coenzyme A on carbon is fairly rapid and is dependent upon the pH of the solution and the amount of carbon used. At the optimum pH, a contact time of about 15 to 45 minutes is usually satisfactory.

The carbon cake, having the adsorbed coenzyme A thereon, can be separated from the liquid in any convenient manner, such as by filtration or centrifugation. If desired, the resulting cake can be washed with water having the same pH as the original filtrate, or with aqueous acetone containing about forty percent acetone and having a pH of about one to four, or preferably a combination of both. Such washing removes a considerable quantity of the impurities and valuable by-products, but is not essential to the process of the present invention.

Coenzyme A in a purified condition can be recovered from the carbon cake by elution with aqueous acetone containing between 10 and 75 percent acetone and having a pH of between about seven and eleven, the preferred concentration of acetone being between 25 and 40 percent and the preferred pH being between about 7.5 and 9.5.

The coenzyme A present in the eluate can be recovered either by precipitation or by evaporation of the solvent. In order to isolate coenzyme A by removal of the solvent, the acetone is removed under reduced pressure, and the aqueous extract freeze dried to obtain coenzyme A in the form of a powder usually assaying between two and one-half and four and one-half units of coenzyme A per milligram of solids. If desired, the pH of the solution can be adjusted to seven before the solvent is removed.

Coenzyme A can also be precipitated from the eluate by adjusting the pH of the solution to seven and adding acetone until the total acetone concentration is at least 95 percent. The precipitate can then be dissolved in water and freeze dried or it can be dried by washing with acetone and diethyl ether.

Alternatively, a coenzyme A preparation of good quality can be obtained by acidifying the eluate to a pH of about 1.8 to 2, and precipitating the coenzyme A by adding acetone thereto until a solution containing 95 percent acetone is obtained. The precipitate is then dissolved in water, the solution adjusted to a pH of seven and freeze dried.

Various inorganic acids such as sulfuric or hydrochloric acid and bases such as ammonium hydroxide, sodium hydroxide, potassium hydroxide or sodium carbonate can be used to adjust the pH of the solution.

The coenzyme A preparations thus obtained are further purified, if desired, by dissolving the crude powder in water and adjusting the pH to between about 1.5 and 2, whereupon approximately forty percent of the total coenzyme A present precipitates and can be recovered by redissolving in an aqueous alkaline solution, preferably at a pH of about seven, and freeze drying to obtain a powder from which between fifty and eighty percent of the original impurities have been removed. The coenzyme A remaining in the supernatant liquid can be recovered by adsorbing on carbon, separating the carbon and eluting with aqueous acetone at a pH of between four and 11. The coenzyme A thus obtained can be recovered from its solution by freeze drying as described hereinbefore in the form of a powder containing five to ten times as much coenzyme A per unit of solids as the crude powder.

If desired, the precipitate which is formed at a low pH need not be separated from the solution before the supernatant liquid is treated with activated carbon. Alternatively, carbon can be added before the pH of the solution is adjusted to between one and about three. Partially purified coenzyme A can be recovered by separating the solids and eluting with water containing about 25 percent acetone and having a pH of between four and eleven, and preferably seven to 9.5. The adsorption and elution of coenzyme A can be repeated as desired, each complete cycle resulting in a further concentration and purification of coenzyme A.

Solutions of various concentrations of partially purified coenzyme A can be used in the process, the most satisfactory results having been obtained with relatively concentrated solutions. Because of viscosity, the highest concentration of solids containing coenzyme A which can be conveniently used in the process appears to be about forty percent, while a solution containing between about ten and twenty percent solids is most satisfactory.

Although this invention has been described with particular reference to the batchwise purification of coenzyme A, it is to be understood that substantially the same principles and conditions can be applied to a column of activated carbon to obtain a concentrate containing more than 200 units of coenzyme A per milligram of solids.

The following examples are given by way of illustration only and are not to be construed as limiting.

*Example 1A.—Isolation of coenzyme A*

A neomycin-producing strain of Streptomyces fradiae was cultured for 88 hours at 32 degrees centigrade in 4,000 gallons of an aqueous medium which contained twenty grams of corn sugar (Cerelose), 25 grams of soybean meal, five grams of brewer's yeast, five grams of sodium chloride, two grams of calcium carbonate and 0.002 gram of cobaltous chloride ($CoCl_2$) per liter of solution. Assay of the beer showed it to contain 68.4 million units of coenzyme A.

The entire fermentation was adjusted to a pH of 2.9 by the addition of sulfuric acid, heated at sixty degrees centigrade for ten minutes, mixed with approximately 320 pounds of filter aid (Dicalite) and filtered. The filter cake was washed with 800 gallons of water and the filtrate and washings combined. The combined filtrates were cooled to about forty degrees centigrade, mixed intimately with 320 pounds of activated carbon (Darco G 60) for one hour while maintaining the pH of the solution at 2.9 with concentrated sulfuric acid, and filtered. The filter cake was washed with 400 gallons of water, and the fitrates discarded.

The filter cake was eluted with two 120-gallon portions of water containing 25 percent acetone, which had been adjusted to a pH of 8.5 by the addition of sodium hydroxide. The eluates were then combined, adjusted to a pH of seven with sulfuric acid, and the acetone removed by evaporation at a subatmospheric pressure. The resulting aqueous solution was freeze dried, yielding 9200 grams of a product which contained 40.5 million units of coenzyme A. This yield corresponded to a purity of 4.4 units per milligram and the recovery was 59 percent complete.

*Example 1B.—Concentration and partial purification of coenzyme A*

Nine thousand three hundred and ten (9,310) grams of a material obtained as in Example 1A, containing 30.2 million units of coenzyme A (3.25 units per milligram) was dissolved in sufficient water to make 92 liters of solution, mixed with 5000 grams of activated carbon (Nuchar C-190-NU), acidified to a pH of 1.8 with concentrated hydrochloric acid, stirred for one hour and filtered. The filter cake was washed successively with forty liters of acidified water having a pH of 1.9 and 160 liters of aqueous acetone containing forty percent acetone and having a pH adjusted to 1.9 with hydrochloric acid, and the filtrates were discarded. The washed cake was then eluted with 140 liters of an aqueous solution containing forty percent acetone adjusted to a pH of 9.5 by the addition of ammonium hydroxide. The eluate was then acidified to a pH of 1.7 with concentrated hydrochloric acid and diluted with eight volumes of acetone. The precipitate which formed was separated, suspended in water and then adjusted to a pH of 7.5 with sodium hydroxide, and extracted five times with successive one-liter portions of water. The extracts were then freeze dried. Two hundred fifty-four (254) grams of a product containing 17.76 million units of coenzyme A was obtained. This yield corresponds to a purity of 66 units per milligram and a recovery of 58 percent.

*Example 2.—Effect of pH on the adsorption of coenzyme A by charcoal*

Eleven identical samples were prepared by dissolving 0.944 gram of a product, obtained as described in Example 1A, containing 5,100 units of coenzyme A (5.4 units per milligram) in ten milliliters of water. Each sample was adjusted to a different pH, mixed with 500 milligrams of activated carbon for one hour, filtered and the filtrate assayed. The results obtained were as follows:

| Sample No. | pH | Assay of filtrate, units per milliliter | Percent adsorbed | Coenzyme A per gram C, units |
|---|---|---|---|---|
| 1 | 1.0 | 87.5 | .83 | 8,450 |
| 2 | 2.0 | 100 | 80.4 | 8,200 |
| 3 | 3.0 | 170 | 66.6 | 6,800 |
| 4 | 4.0 | 227.5 | 55.5 | 5,650 |
| 5 | 5.0 | 300 | 41.0 | 4,200 |
| 6 | 6.0 | 350 | 31.4 | 3,200 |
| 7 | 7.0 | 300 | 41.0 | 4,200 |
| 8 | 8.0 | 310 | 39.0 | 4,000 |
| 9 | 9.0 | 300 | 41.0 | 4,200 |
| 10 | 10.0 | 410 | 19.0 | 2,000 |
| 11 | 11.0 | 510 | 0 | 0 |

*Example 3.—Effect of acetone concentration on elution*

Twenty-seven (27) grams of a product, prepared as described in Example 1A, containing 147,500 units of coenzyme A (5.5 units per milligram) was dissolved in 280 milliliters of water, adjusted to a pH of 1.9 by the addition of sulfuric acid and stirred with fourteen grams of activated carbon (Nuchar C-190-NU) for one hour at room temperature. The resulting slurry was filtered, and the filter cake washed with 280 milliliters of water previously acidified with sulfuric acid to a pH of 1.9. The wet filter cake, weighing 60.9 grams, was divided into fourteen equal portions of 4.35 grams. The first eight portions were then eluted with an aqueous acetone mixture which had been adjusted to the predetermined pH value by the addition of ammonium hydroxide. The composition of the aqueous acetone solutions, their pH values, and the results obtained, were as follows:

| Composition of eluate | | pH | Volume of eluate, milliliters | Total units | Total solids | Units of coenzyme A per milligram of solids |
|---|---|---|---|---|---|---|
| $H_2O$ (percent) | Acetone (percent) | | | | | |
| 100 | 0 | 9.5 | 30 | 3,000 | 192 | 15.6 |
| 95 | 5 | 9.5 | 30 | 4,275 | 228 | 18 |
| 90 | 10 | 9.5 | 30 | 5,625 | 261 | 21.6 |
| 80 | 20 | 9.5 | 30 | 6,300 | 306 | 20.6 |
| 75 | 25 | 9.5 | 30 | 6,450 | 321 | 20.6 |
| 60 | 40 | 9.5 | 30 | 7,200 | 351 | 20.5 |
| 50 | 50 | 9.5 | 30 | 7,425 | 369 | 20.1 |
| 60 | 40 | 4.5 | 30 | 2,800 | 210 | 13.4 |

*Example 4.—Chromatography of coenzyme A*

A chromatographic column was prepared by mixing four grams of activated carbon (Nuchar C-190-NU) and two grams of filter aid (Celite 545) with twenty milliliters of water, adjusting the pH of the slurry to 1.8 with hydrochloric acid, filtering, washing the cake with water until the effluent had a pH of 2.3, reslurrying the cake with forty milliliters of water and introducing the slurry into a Pyrex tube. Water was introduced into the top of the tube until the column had a stable height of approximately 22 centimeters. After the height of the activated carbon mixture had reached a constant level, the liquid level was allowed to fall to just above the top of the carbon and fourteen milliliters of the product obtained in Example 1A containing a total of approximately 66,000 units of coenzyme A (one gram of solid containing 66 units per milligram) was added to the top of the column. As this solution passed down the column, 130 milliliters of water, previously acidified with hydrochloric acid, was added to the column, and then ten milliliters of water containing two milliliters of concentrated hydrochloric acid, followed by eighty milliliters of distilled water and forty milliliters of aqueous acetone containing forty percent acetone which had been adjusted with hydrochloric acid to a pH of 1.9.

The coenzyme A was eluted from the column by passing 240 milliliters of aqueous acetone containing forty percent acetone and having a pH of approximately nine, which corresponds to the addition of four milliliters of concentrated ammonium hydroxide per liter of solution, and the eluate collected in 48 aliquots of five milliliters each. As only two aliquots, numbers 26 and 27, contained coenzyme A having a purity of more than 200 units of coenzyme A per milligram of solids, the remaining fractions were discarded. Aliquot 26 contained a total of 6960 units at a purity of 200 units per milligram while aliquot 27 contained a total of 9920 units at a purity of 217 units per milligram. This recovery corresponds to more than 25 percent of the coenzyme A originally present and the purity was greater than 200 units of coenzyme A per milligram of solids.

Although the foregoing specification comprises preferred embodiments of the invention, it is to be understood that the invention is not limited to the exact details shown and described, and that variations and modifications may be made in conventional manner without departing from the scope of the invention as defined in the appended claims.

We claim:

1. In a process for the isolation of coenzyme A, the steps comprising: contacting activated carbon with an aqueous solution of coenzyme A having a pH of between about one and five; separating the carbon containing the adsorbed coenzyme A from the aqueous solution; eluting the coenzyme A from the carbon with aqueous acetone having a pH of between about seven and eleven; and recovering coenzyme A from the eluate.

2. In a process for the isolation of coenzyme A, the steps comprising: contacting activated carbon with an aqueous solution of coenzyme A having a pH of between about one and four; separating the carbon containing the adsorbed coenzyme A from the aqueous solution; eluting the coenzyme A from the carbon with aqueous acetone having a pH of between about 7.5 and 9.5; and recovering the coenzyme A from the eluate.

3. In a process for the isolation of coenzyme A, the steps comprising: contacting activated carbon with an aqueous solution of coenzyme A having a pH of between about one and four; separating the carbon containing the adsorbed coenzyme A from the aqueous solution; eluting the coenzyme A from the carbon with aqueous acetone containing between about 10 and 75 percent acetone and having a pH of between about seven and eleven; and recovering the coenzyme A from the eluate.

4. In a process for the isolation of coenzyme A, the steps comprising: contacting activated carbon with an aqueous solution of coenzyme A having a pH between about one and four; separating the carbon containing the adsorbed coenzyme A from the aqueous solution; eluting the coenzyme A from the carbon with aqueous acetone containing between about 25 and 40 percent acetone and having a pH of between about 7.5 and 9.5; and recovering coenzyme A from the eluate.

5. In a process for the isolation of coenzyme A, the steps comprising: contacting activated carbon with an aqueous solution of coenzyme A having a pH between about one and four in a ratio of about ten grams of activated carbon to one liter of aqueous solution of coenzyme A; separating the carbon containing the coenzyme A from the aqueous solution; eluting the coenzyme A from the carbon with aqueous acetone containing between about 25 and 40 percent acetone and having a pH between about 7.5 and 9.5; and recovering coenzyme A from the eluate.

6. In a process for the isolation of coenzyme A, the steps comprising: contacting activated carbon with an aqueous solution of coenzyme A having a pH of between about one and four in a ratio of ten grams of activated carbon to one liter of aqueous solution of coenzyme A; separating the carbon containing the adsorbed coenzyme A from the aqueous solution; eluting the coenzyme A from the carbon with 25 percent aqueous acetone having a pH of 8.5; and recovering the coenzyme A from the eluate.

7. In a process for the isolation of coenzyme A from a microbiological organism, the steps comprising: heating the entire fermentation between about 60 and 120 degrees centigrade; removing the cells; contacting activated carbon with an aqueous extract of coenzyme A having a pH of between about one and four; separating the carbon containing the adsorbed coenzyme A from the aqueous solution; eluting the coenzyme A from the carbon with aqueous acetone having a pH between about seven and eleven; and recovering the coenzyme A from the eluate.

8. In a process for the isolation of coenzyme A from a microbiological organism, the steps comprising: heating the entire fermentation between about 60 and 120 degrees centigrade at a pH of between about one and three; removing the cells; contacting activated carbon with an aqueous extract of coenzyme A having a pH of between about one and four; separating the carbon containing the adsorbed coenzyme A from the aqueous solution; eluting the coenzyme A from the carbon with aqueous acetone having a pH of between about seven and eleven; and recovering coenzyme A from the eluate.

9. In a process for the isolation of coenzyme A from a microbiological organism, the steps comprising: heating the entire fermentation between about 60 and 120 degrees centigrade at a pH of between about one and three; removing the cells; contacting activated carbon with an aqueous extract of coenzyme A having a pH of between about one and four; separating the carbon containing the adsorbed coenzyme A from the aqueous solution; eluting the coenzyme A from the carbon with aqueous acetone containing from between about 10 and 75 percent acetone and having a pH of between about seven and eleven; and recovering coenzyme A from the eluate.

10. In a process for the isolation of coenzyme A, the steps comprising: adsorbing coenzyme A on activated carbon by contacting activated carbon with an aqueous solution of coenzyme A at a pH at which coenzyme A is adsorbed on activated carbon; separating the carbon containing the adsorbed coenzyme A from the aqueous solution; eluting the coenzyme A from the carbon with aqueous acetone; and recovering coenzyme A from the eluate.

11. In a process for the isolation of coenzyme A, the steps comprising: contacting activated carbon with an aqueous solution of coenzyme A at a pH of about 1 to 10; separating the carbon containing the adsorbed coenzyme A from the aqueous solution; eluting the coenzyme A from the carbon with aqueous acetone under alkaline conditions; and recovering coenzyme A from the eluate.

12. In a process for the recovery of coenzyme A from a culture of a microorganism selected from the group consisting of Clostridium butylicum, Streptomyces, and Penicillia, the steps comprising: contacting activated carbon with an aqueous solution of coenzyme A produced by a culture of such organisms at a pH of about 1 to 10; separating the carbon containing the adsorbed coenzyme A from the aqueous solution; eluting the coenzyme A from the carbon with aqueous acetone; and recovering coenzyme A from the eluate.

13. In a process for the isolation of coenzyme A from Streptomyces griseus, the steps comprising: heating an aqueous culture of Streptomyces griseus at a temperature between about sixty and 120 degrees centigrade; removing the cells; contacting activated carbon with the aqueous solution of coenzyme A thus-produced at a pH between about one and about four; separating the carbon containing the adsorbed coenzyme A from the aqueous residue; eluting the coenzyme A from the carbon with aqueous acetone having a pH between about seven and about eleven; and recovering the coenzyme A from the eluate.

14. In a process for the isolation of coenzyme A from Streptomyces fradiae, the steps comprising: heating the culture of Streptomyces fradiae at a temperature between about sixty and 120 degrees centigrade; removing the cells; contacting activated carbon with the aqueous solution of coenzyme A thus-produced at a pH between about one and about four; separating the carbon containing the adsorbed coenzyme A from the aqueous residue; eluting the coenzyme A from the carbon with aqueous acetone having a pH between about seven and about eleven; and recovering the coenzyme A from the eluate.

15. In a process for the isolation of coenzyme A from Penicillium notatum, the steps comprising: heating the culture of Penicillium notatum at a temperature between about sixty and 120 degrees centigrade; removing the cells; contacting activated carbon with the aqueous solution of coenzyme A thus-produced at a pH between about one and about four; separating the carbon containing the adsorbed coenzyme A from the aqueous residue; eluting the coenzyme A from the carbon with aqueous acetone having a pH between about seven and about eleven; and recovering the coenzyme A from the eluate.

16. In a process for the isolation of coenzyme A from Clostridium butylicum, the steps comprising: heating the culture of Clostridium butylicum at a temperature between about sixty and 120 degrees centigrade; removing the cells; contacting activated carbon with the aqueous extract of coenzyme A thus-produced at a pH between about one and about four; separating the carbon containing the adsorbed coenzyme A from the aqueous residue; eluting the coenzyme A from the carbon with aqueous acetone having a pH between about seven and about eleven; and recovering the coenzyme A from the eluate.

References Cited in the file of this patent

Lipmann: Jour. Biol. Chem. 160 (1945), article, pp. 173 to 190, pp. 183, 185, 186.

Nachmansohn et al.: Jour. Biol. Chem. 165 (1946), article, pp. 551–563, pp. 552–553 relied upon.

Le Page et al.: Jour. Biol. Chem. 180 (1949) pp. 975–984.

Lipmann et al.: Jour. Biol. Chem. 186 (1950), pp 235–243, p. 241 relied upon.

De Vries et al.: J. Am. Chem. Soc., 72, 4838 (1950).